(12) United States Patent
Nishino et al.

(10) Patent No.: US 8,071,952 B2
(45) Date of Patent: Dec. 6, 2011

(54) RADIOGRAPHIC IMAGE DETECTION DEVICE

(75) Inventors: Naoyuki Nishino, Kanagawa (JP); Yutaka Yoshida, Kanagawa (JP); Yasunori Ohta, Kanagawa (JP); Keiji Tsubota, Kanagawa (JP); Takeshi Kamiya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 244 days.

(21) Appl. No.: 12/539,628

(22) Filed: Aug. 12, 2009

(65) Prior Publication Data

US 2010/0038549 A1 Feb. 18, 2010

(30) Foreign Application Priority Data

Aug. 18, 2008 (JP) ................................. 2008-209815

(51) Int. Cl.
*H01L 27/146* (2006.01)
(52) U.S. Cl. ................................................. 250/370.09
(58) Field of Classification Search .............. 250/370.09
See application file for complete search history.

(56) References Cited

U.S. PATENT DOCUMENTS 6,805,484 B2 * 10/2004 Kuramoto et al. ............ 378/189

FOREIGN PATENT DOCUMENTS

JP 2004-77641 A 3/2004

* cited by examiner

*Primary Examiner* — David Porta
*Assistant Examiner* — Christine Sung
(74) *Attorney, Agent, or Firm* — SOLARIS Intellectual Property Group, PLLC

(57) ABSTRACT

There is provided a radiographic image detection device including: a radiation detection portion that includes an irradiation surface at which radiation is irradiated and is provided, at a plurality of locations on side faces, with attachment portions at which a handle is attachable, the radiation detection portion detecting radiation that has passed through a subject of imaging and been irradiated through the irradiation surface, and outputting image information that represents a radiographic image in accordance with detected radiation amounts; and a handle portion that is attachable and detachable at the attachment portions.

6 Claims, 9 Drawing Sheets

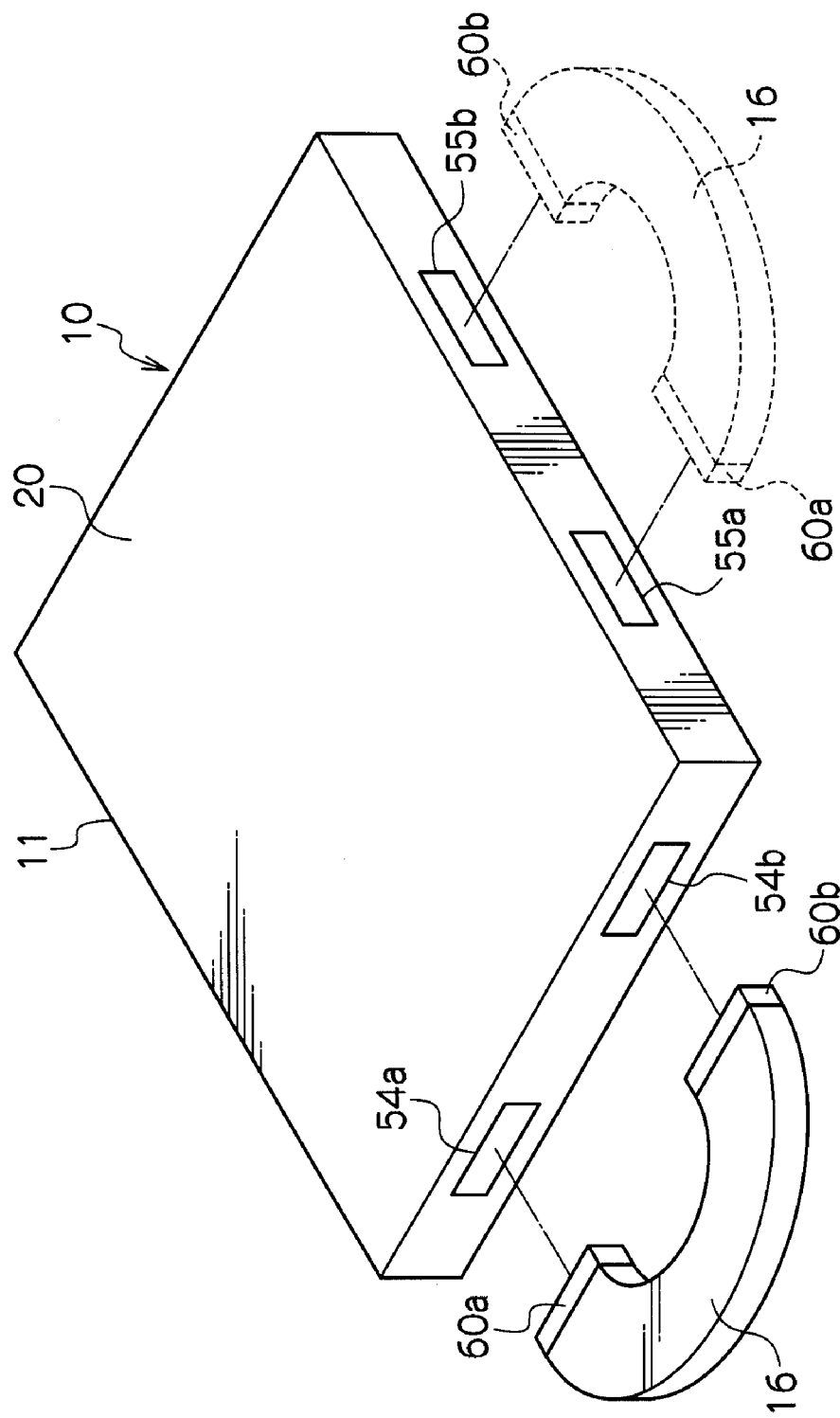

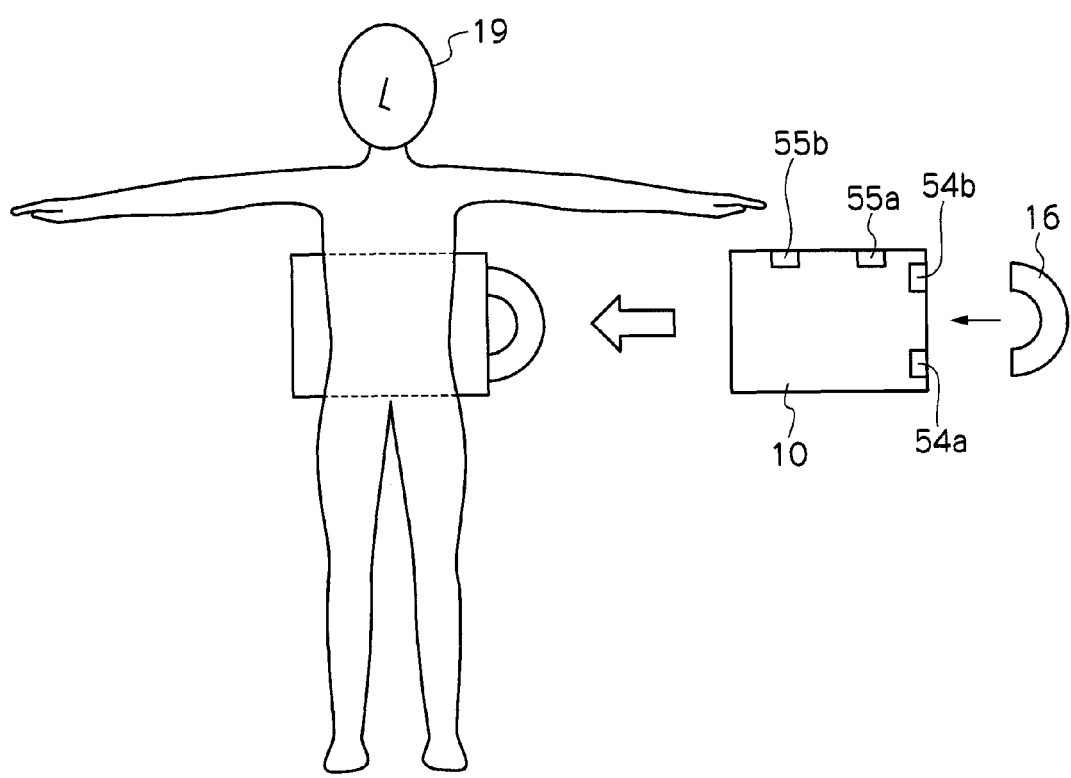

US 8,071,952 B2

RADIOGRAPHIC IMAGE DETECTION DEVICE

CROSS-REFERENCE TO RELATED APPLICATION

This application is based on and claims priority under 35 USC 119 from Japanese Patent Application No. 2008-209815 filed Aug. 18, 2008, the disclosure of which is incorporated by reference herein.

BACKGROUND

1. Technical Field

The present invention relates to a radiographic image detection device, and more particularly to a radiographic image detection device that features portability.

2. Related Art

In recent years, FPDs (flat panel detectors) have been realized in which an X-ray-sensitive layer is disposed on a TFT (thin film transistor) active matrix substrate and X-rays can be directly converted to digital data. Using these FPDs and the like, portable radiographic image detection devices (below referred to as electronic cassettes) have been realized in which image data, which represents a radiographic image that is expressed by radiation passing through a subject and being irradiated, is generated and the generated image data is stored. In consideration of portability, a handle, which functions as a carrying handle, is often provided at this kind of electronic cassette.

In a radiographic image detection system that utilizes an electronic cassette, the electronic cassette is disposed to be spaced apart from a radiation generation section that generates radiation such as or the like. At a time of capturing of a radiographic image, a subject of imaging is disposed between the radiation generation section and the electronic cassette. If a condition of imaging is a standing position, the electronic cassette is mounted on a standing position frame, and if the imaging condition is a recumbent position, the electronic cassette is inserted between a bed and the subject of imaging. In either of these imaging conditions, the standing position or the recumbent position, it is necessary that the handle provided at the electronic cassette does not become an impediment to imaging.

Accordingly, electronic cassettes have been proposed that, by making the position of a carrying handle movable in a side face corresponding to one edge of the electronic cassette, making a carrying handle removable, or making a carrying handle deformable, are configured such that the carrying handle is not an impediment when the electronic cassette is mounted on a standing position frame (see, for example, Japanese Patent Application Laid-Open (JP-A) No. 2004-77641).

However, there is a problem with the electronic cassette according to JP-A No. 2004-77641, in that no consideration is given to whether the electronic cassette is put into a vertical orientation or into a horizontal orientation in the case of a standing position, or to which edge matches the length direction of a bed in the case of a recumbent position. Thus, depending on an orientation of the electronic cassette, the carrying handle may be an impediment when the electronic cassette is being mounted in a standing position frame or when the electronic cassette is being inserted between a bed and a subject of imaging, or the like.

SUMMARY

The present invention has been made in order to solve the problem described above, and an object is to provide a radiographic image detection device capable of facilitating handling in orientations corresponding to imaging conditions, without impairing portability.

In order to achieve the object described above, the present invention provides a radiographic image detection device including:

a radiation detection portion that
  includes an irradiation surface at which radiation is irradiated and
  is provided, at a plurality of locations on side faces, with attachment portions at which
  a handle is attachable,
the radiation detection portion detecting radiation that has passed through a subject of imaging and been irradiated through the irradiation surface, and outputting image information that represents a radiographic image in accordance with detected radiation amounts; and
  a handle portion that is attachable and detachable at the attachment portions.

According to the radiographic image detection device of the present invention, the attachment portions to which a handle can be attached are provided at plural locations in side faces of the radiation detection portion, which detects radiation irradiated through the irradiation surface at which radiation is irradiated through a subject of imaging and which outputs image information that represents a radiographic image in accordance with detected radiation amounts, and the handle portion is attachable/detachable with respect to the attachment portions.

Thus, because the attachment portions to which the handle portion is attachable are provided at plural locations, when the radiographic image detection device is to be mounted in a standing position frame or inserted between a bed and a subject of imaging, the handle may be attached at a position that is easier to handle in accordance with the orientation in which the radiographic image detection device is to be mounted or inserted. Therefore, without impairing portability, handling in orientations corresponding to imaging conditions may be facilitated.

Further, the radiation detection portion may be rectangular and formed such that the attachment portions are provided in each of a long edge side face and a short edge side face. When the radiation detection portion is rectangular with a long side and a short side, that is, in a long rectangular form, in accordance with forming a structure in which the attachment portions are provided in both a long edge side face and a short edge side face, the handle may be attached to the side face that is easier to handle in accordance with a horizontal orientation, a vertical orientation or the like, and this is effective.

Further, the radiographic image detection device of the present invention may further include:
  a detection section that detects a position of the attachment portion at which the handle portion is attached; and
  a control section that controls such that the position detected by the detection section and the image information outputted from the radiation detection portion are stored in association in a storage section.

Further, the radiographic image detection device of the present invention may further include an image processing section that, on the basis of the position detected by the detection section, performs image processing that rotates the image information stored in the storage section so as to correspond to an orientation of the radiographic image represented by the image information outputted from the radiation detection portion.

Further, the radiographic image detection device of the present invention may further include:

a detection section that detects a position of the attachment portion at which the handle portion is attached; and a control section that performs image processing that, on the basis of the position detected by the detection section, rotates the image information so as to correspond to an orientation of a radiographic image represented by the image information outputted from the radiation detection portion, and controls so as to store the image information in a storage section.

Further, in the radiographic image detection device of the present invention, the handle portion may include a reporting section that reports when an attachment position of the handle portion at a previous occasion of detecting radiation and an attachment position of the handle portion at a current occasion of detecting radiation are different.

Further, one or both of a communication section for implementing communications with an external device and a power supply for driving the radiation detection portion may be provided in the handle portion. Because the handle may be attached at, of the plural attachment portions, a position that is easier to handle when the radiographic image detection device is to be mounted or inserted at a standing position frame or between a bed and a subject of imaging, the handle portion may be attached at a position that will not be covered by the subject of imaging. When the communication section is disposed in the handle portion that is accordingly not covered by the subject of imaging, connection of a cable is easier in a case of wired communication and transmission problems due to the effect of the subject of imaging may be avoided in a case of wireless communication. Moreover, when a power supply section is provided in the handle portion, the radiation detection portion may be reduced in size.

Further, a ventilation aperture for ventilating air inside the radiation detection portion may be formed in one or more of the attachment portions. Because there are plural attachment portions at which the handle is attachable/detachable, whichever attachment portion the handle is attached to, the remaining attachment portions may function as ventilation apertures.

According to the radiographic image detection device of the present invention as described above, an effect is provided in that handling in orientations corresponding to imaging conditions is facilitated without impairing portability.

BRIEF DESCRIPTION OF THE DRAWINGS

Exemplary embodiments of the present invention will be described in detail based on the following figures, wherein:

FIG. 2 is a perspective view illustrating the exterior of the electronic cassette of the exemplary embodiment;

FIG. 5A is a view illustrating disposition of the electronic cassette in a horizontal orientation;

DETAILED DESCRIPTION

Herebelow, an exemplary embodiment of the present invention will be described in detail with reference to the drawings.

Figure 1A:
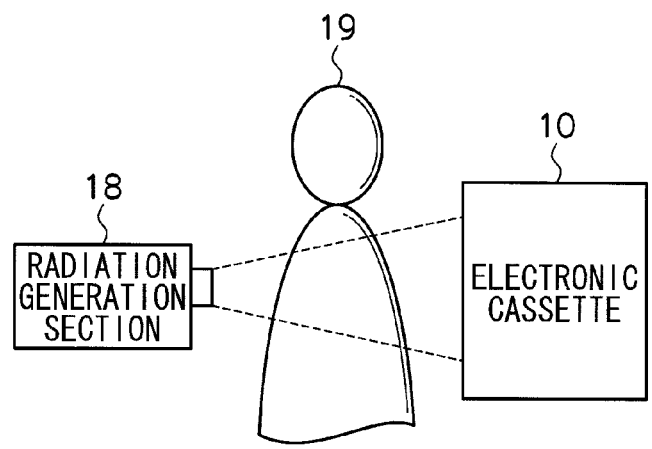
FIG. 1A is a schematic view illustrating disposition during radiographic imaging of an electronic cassette relating to an exemplary embodiment.

As shown in FIG. 1A, a portable radiographic image detection device (hereafter referred to as an electronic cassette) 10 relating to a first exemplary embodiment is disposed to be spaced apart from a radiation generation section 18, which generates radiation such as X-rays or the like, at a time of capturing of a radiographic image. An imaging position, for a subject of imaging 19 to be disposed in, is formed between the radiation generation section 18 and the electronic cassette 10 at this time. When capturing of a radiographic image is instructed, the radiation generation section 18 emits radiation in a radiation amount corresponding to imaging conditions provided in advance or the like. The radiation emitted from the radiation generation section 18 passes through the subject of imaging 19 disposed at the imaging position and, carrying image information, is irradiated onto the electronic cassette 10.

Figure 1B:
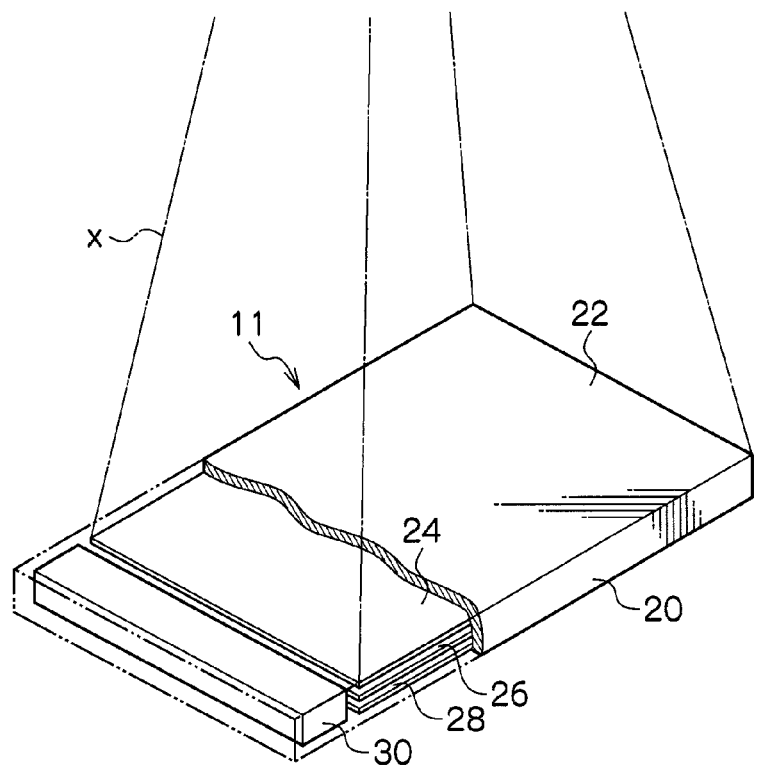
FIG. 1B is a schematic perspective view illustrating internal structure of the electronic cassette of the exemplary embodiment.

The electronic cassette 10 is structured with a radiation detector 11 and a handle 16. As shown in FIG. 1B, the radiation detector 11 is covered by a flat plate-form casing 20 that has some thickness and is formed of a material that transmits radiation X. Inside the casing 20, a grid 24, a radiographic detection panel 26 and a lead plate 28 are arranged in this order from, of the casing 20, the side of an irradiation surface 22 onto which the radiation X is irradiated. The grid 24 eliminates scattered rays of the radiation X that are generated as the radiation X passes through the subject of imaging 19. The radiographic detection panel 26 detects the radiation X. The lead plate 28 absorbs back-scattered rays of the radiation X. The irradiation surface 22 of the casing 20 may be constituted by the grid 24. A case 30 that accommodates various circuitry including a microcomputer is disposed at one end of the interior of the casing 20. In order to prevent the various circuits accommodated inside the case 30 being damaged by irradiation of the radiation X, it is desirable for lead plating or the like to be disposed at the irradiation surface 22 side of the case 30.

As shown in FIG. 2, the handle 16, which serves as a carrying handle for carrying the electronic cassette 10, is provided at the electronic cassette 10. The handle 16 includes attachment portions 60a and 60b for attachment to the radiation detector 11. Correspondingly, in a short edge side face of the radiation detector 11, which has a long rectangular form in plan view, attachment portions 54a and 54b are provided, to which the attachment portions 60a and 60b of the handle 16 are detachably connected. In the long edge side face of the same, attachment portions 55a and 55b are provided, to which the attachment portions 60a and 60b of the handle 16 are detachably connected. Thus, the handle 16 is attachable/detectable with respect to the radiation detector 11, and functions as a carrying handle of the electronic cassette 10 when mounted to the radiation detector 11.

The handle 16 is formed in a letter U shape. Herein, provided the shape functions as a carrying handle, it may be any shape forming a cavity, such as a letter T shape, a letter U shape, a circle or the like. Further, it may be a non-penetrated structure, that is, a structure not having a cavity through which a hand (or a portion of the hand such as a finger or the like) is inserted. For example, it may be a handle in which a recess is formed for engaging a hand (or a portion of the hand such as a finger or the like), a handle on which a graspable protrusion is formed, or the like. Further yet, the attachment portion for attaching the handle 16 is not limited to the side faces at two edges of the casing 20 of the radiation detector 11, and may be provided at three edges or four edges.

Figure 3:
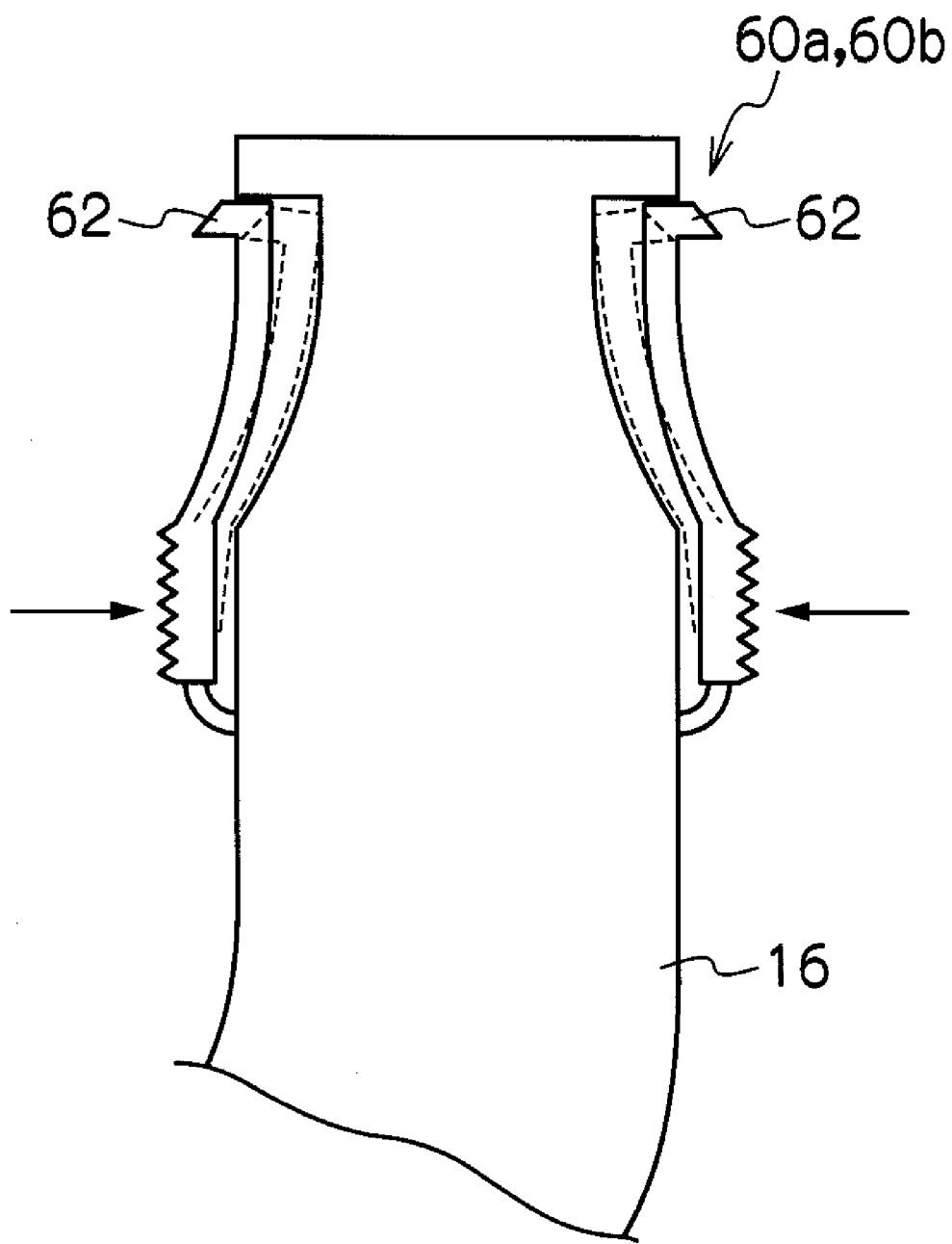
FIG. 3 is a schematic view illustrating an attachment portion of the handle.

Holes for inserting the attachment portions 60a and 60b of the handle 16 into the casing 20 are formed at the radiation detector 11 in the attachment portions 54a, 54b, 55a and 55b. As shown in FIG. 3, the attachment portions 60a and 60b at the handle 16 are provided with stoppers 62 at side faces of the handle 16. The stoppers 62 have distal ends with hook forms and are attached to the main body of the handle 16 by resilient members. In a usual state, the hook-form distal ends of the stoppers 62 are at positions protruding beyond the width of the handle 16. When the portions arrowed in FIG. 3 are pressed, the hook portions are accommodated within the width range of the handle 16. In a state in which the attachment portions 60a and 60b of the handle 16 are pushed into the attachment portions of the radiation detector 11, the hook-form distal ends of the stoppers 62 engage with the holes in the casing 20 that are formed to serve as the attachment portions 54a, 54b, 55a and 55b of the radiation detector 11, and thus the handle 16 is mounted to the radiation detector 11.

The holes in the casing 20 that are formed to serve as the attachment portions 54a, 54b, 55a and 55b of the radiation detector 11 function as ventilation apertures for ventilating air inside the radiation detector 11. Because the attachment portions are provided in a long edge side face and a short edge side face of the electronic cassette 10, when the handle 16 is mounted to the attachment portions 55a and 55b in the long edge side face, the attachment portions 54a and 54b in the short edge side face act as ventilation apertures, and when the handle 16 is mounted to the attachment portions 54a and 54b in the short edge side face, the attachment portions 55a and 55b in the long edge side face act as ventilation apertures.

Figure 4:
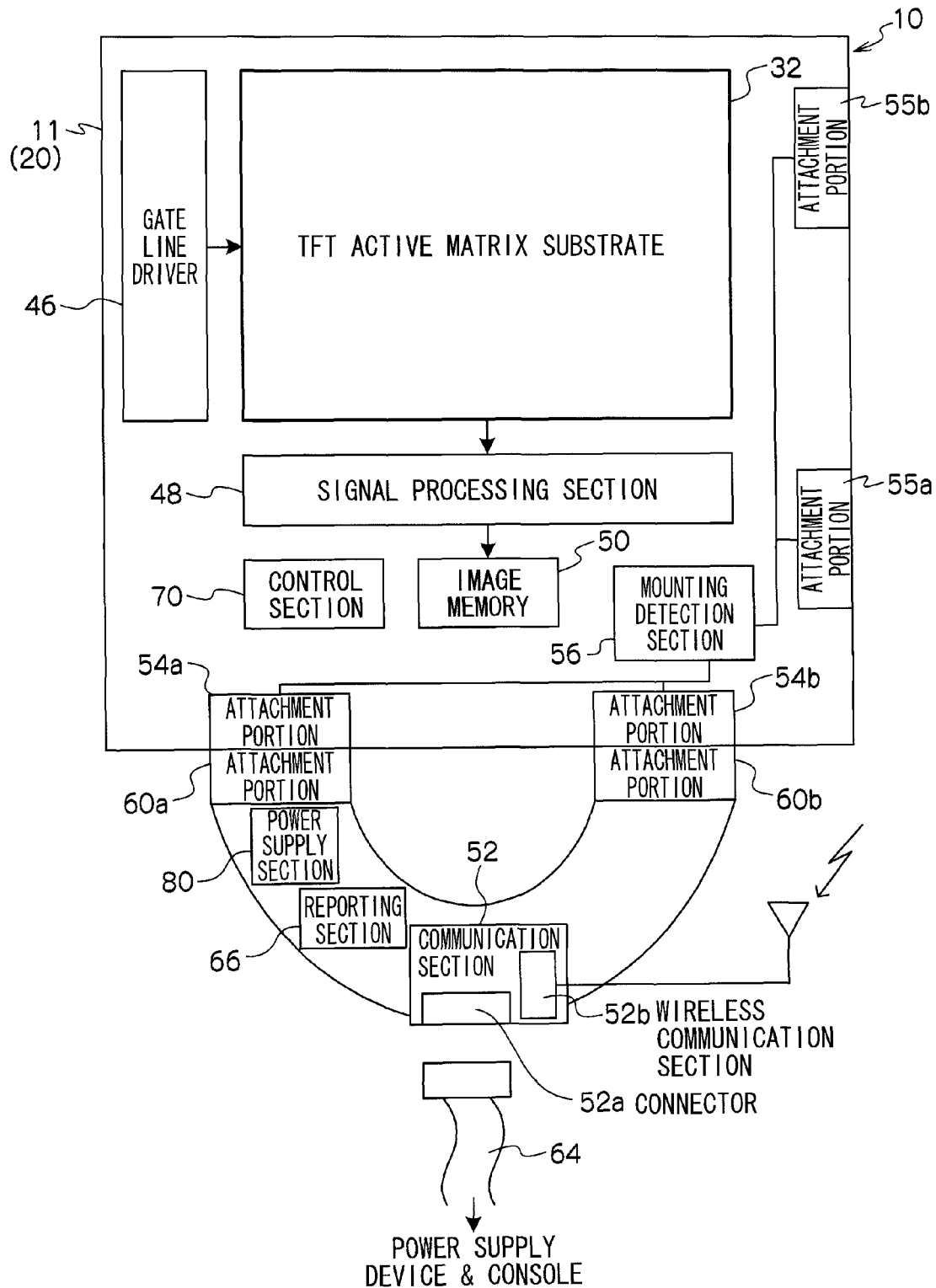
FIG. 4 is a block diagram illustrating schematic structure of the electronic cassette of the exemplary embodiment.

The radiation detector 11 is structured by a charge generation layer, which absorbs radiation and converts the same to electric charges, being layered onto a TFT active matrix substrate 32, which is shown in FIG. 4. The charge generation layer is formed of, for example, noncrystalline a-Se (amorphous selenium) of which selenium is a principal component (for example, a proportional content of at least 50%). When radiation is irradiated thereon, the charge generation layer generates electric charges (electron-hole pairs) thereinside with a charge amount corresponding to the irradiated radiation amount. Thus, the irradiated radiation is converted to electric charges. Cumulative capacitances, which accumulate the charges generated in the charge generation layer, and pixel portions, which are provided with TFTs for reading out the charges accumulated in the cumulative capacitances, are numerously provided in a matrix form on the TFT active matrix substrate 32. The charges that are generated in the charge generation layer in accordance with irradiation of radiation onto the radiation detector 11 are accumulated in the individual cumulative capacitances of the pixel portions. Thus, image information carried by the radiation irradiated onto the radiation detector 11 is converted to electric charge information and retained in the radiation detector 11.

Plural gate lines and plural data lines are provided in the TFT active matrix substrate 32. The gate lines extend in a certain direction (a column direction) and are for turning the TFTs of the pixel portions on and off. The data lines are provided in a direction crossing the gate lines (a row direction) and are for reading out the accumulated charges from the cumulative capacitances via the TFTs that have been turned on. The respective gate lines are connected to a gate line driver 46, and the respective data lines are connected to a signal processing section 48. When charges are accumulated in the cumulative capacitance of the respective pixel portions, the TFTs of the pixel portions are turned on sequentially, column by column, by signals provided through the gate lines from the gate line driver 46. The charges accumulated in the cumulative capacitances of the pixel portions for which the TFTs have been turned on are propagated through the data lines as charge signals and inputted to the signal processing section 48.

The signal processing section 48 is provided with amplifiers and sample and hold circuits, which are provided for each of the data lines. The charge signals propagated through the respective data lines are amplified by the amplifiers and then retained in the sample and hold circuits. A multiplexer and an A/D converter are provided, in this order, at the output sides of the sample and hold circuits. The charge signals retained by the respective sample and hold circuits are sequentially (serially) inputted into the multiplexers and converted to digital image data by the A/D converters. An image memory 50 is connected to the signal processing section 48, and the image data outputted from the A/D converters of the signal processing section 48 is sequentially stored in the image memory 50.

The electronic cassette 10 is provided, at the radiation detector 11, with a mounting detection section 56, which detects whether or not the handle 16 is mounted to the radiation detector 11, and a control section 70. A communication section 52, a reporting section 66 and a power supply section 80 are provided at the handle 16. The communication section 52 is for implementing communication with external devices such as a power supply device and a console or the like. The reporting section 66 is for reporting errors relating to operations of the electronic cassette. The power supply section 80 provides electrical power to the various circuits and components for operating the electronic cassette 10.

The mounting detection section 56 is provided with signal lines from the radiation detector 11 to the handle 16, which are connected at the attachment portions 54a, 54b, 55a and 55b, for each of the attachment portions 54a and 54b in the short edge side face and the attachment portions 55a and 55b in the long edge side face. The mounting detection section 56 detects whether or not the handle 16 is mounted to the radiation detector 11, and whether the handle 16 is mounted to the attachment portions of the short edge side face or the long edge side face, by sensing outputs of the signal lines. Herein, a constitution may be formed that detects whether or not the handle 16 is mounted to the radiation detector 11 using light such as infrared rays or the like, an electrostatic effect (for example, a method of detecting whether inductors are close together or not by electrostatic capacitance), or the like, and a constitution may be formed that detects when attachment portions relatively reach predetermined positions by sensors. The control section 70 is constituted by a microcomputer that includes: a CPU which administers overall control of the electronic cassette 10; a ROM which serves as a storage medium that stores a later-described program for image data generation processing; a RAM which serves as a work area and temporarily stores data; and a memory which serves as a storage unit in which various kinds of information are stored. The control section is not limited to controlling operations of the whole device as in the present exemplary embodiment, and may be a section that controls operations of a portion of the device.

The communication section 52 is provided with a connector 52a, for connecting a coaxial cable 64 for implementing provision of electric power and propagation of data, and a wireless communication section 52b. Wired communications are implemented when a cable is connected to the connector 52a, and wireless communications are implemented when no cable is connected.

The reporting section 66 is structured with an LED lamp and a speaker for outputting buzzer sounds, or the like. Errors are reported by plurally providing LED lamps and illuminating LED lamps selected in accordance with categories of error, outputting buzzer sounds with altered rhythms in accordance with categories of error, and the like.

For the power supply section 80, a structure that incorporates a battery (a rechargeable secondary cell) so as not to impair portability of the electronic cassette 10 and provides power to the various circuits and elements from the charged battery will be excellent. However, the power supply section 80 may employ a primary cell as a battery, or may be constituted to be continuously connected to a commercial power source through a power supply cable connected to the connector 52a of the communication section 52, rectifying and transforming power provided from the commercial power source and providing this power to the various circuits and elements. Herein, the power supply section is not limited to a section that provides electric power to constituent sections of the whole device as in the present exemplary embodiment, and may provide electric power to constituent sections of a portion of the device. Moreover, a structure including plural power supply sections is possible.

Now, the relationship between mounting positions of the handle 16 with respect to the radiation detector 11 and orientations of radiographic images representing the image data that is generated will be described.

Figure 5B:
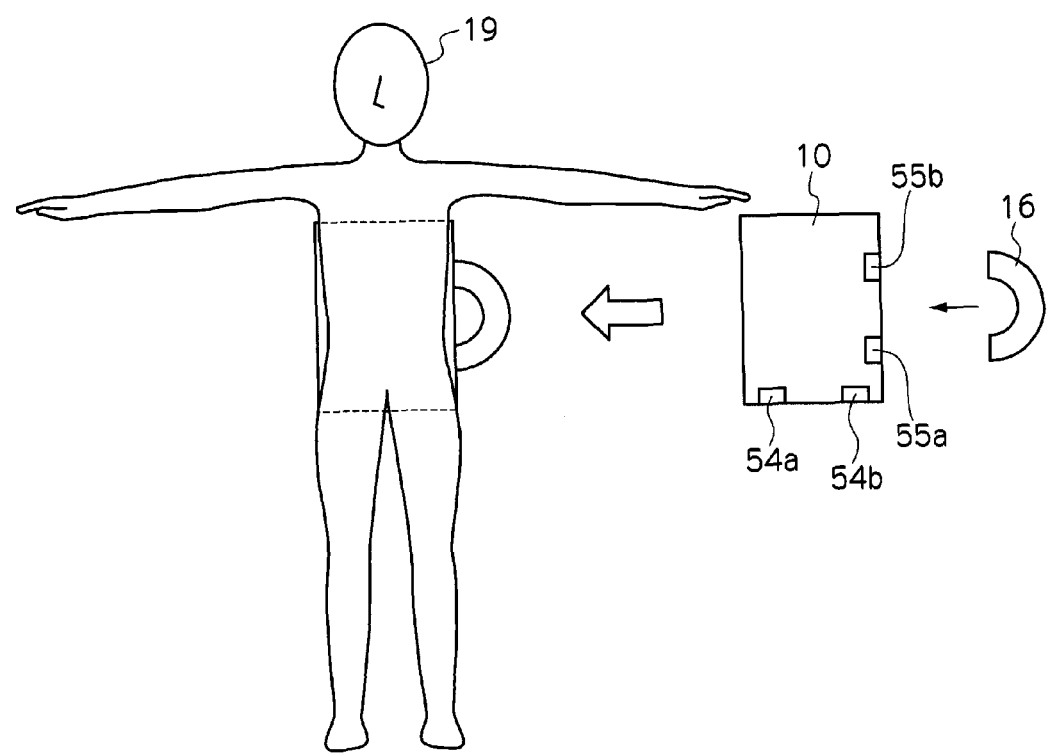
FIG. 5B is a view illustrating disposition of the electronic cassette in a vertical orientation.

An arrangement in which the long edge of the electronic cassette 10 is parallel with a direction orthogonal to the head-foot direction (a direction from the head toward the feet), as shown in FIG. 5A, is referred to as the horizontal orientation, and an arrangement in which the long edge of the electronic cassette 10 is parallel with the head-foot direction, as shown in FIG. 5B, is referred to as the vertical orientation.

Figure 6:
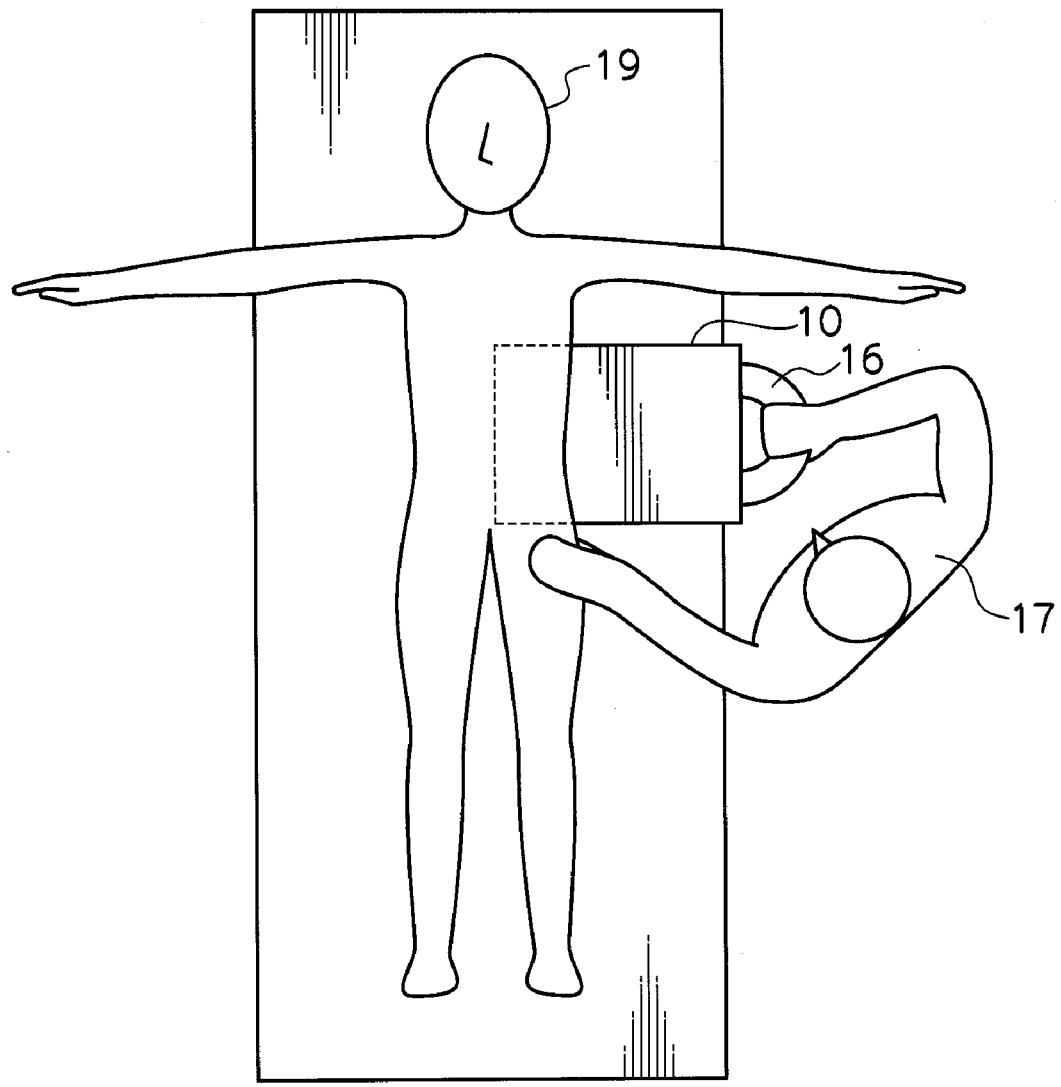
FIG. 6 is a view illustrating handling of the electronic cassette.

When, for example, the electronic cassette 10 is to be inserted between a bed and the subject of imaging 19, as shown in FIG. 6, it is usual for an operator 17 of the electronic cassette 10 to grasp the handle 16 and insert the electronic cassette 10 between the bed and the subject of imaging 19, leading with the side of the opposite edge from the edge at which the handle 16 is mounted. With consideration to this handling of the electronic cassette 10, in a horizontal orientation case, the handle 16 is easier to handle when attached to the short edge side face of the radiation detector 11, and in a vertical orientation case, the handle 16 is easier to handle when attached to the long edge side face of the radiation detector 11.

In the electronic cassette 10 of the present exemplary embodiment, image data representing a radiographic image is generated with the long edge at the side at which the attachment portions 55a and 55b are provided in the long edge side face being at the top. Further, the attachment portions 54a and 54b are provided in the short edge side face that is adjacent in a right-turning direction to the long edge in which the attachment portions 55a and 55b are provided. Moreover, the operator 17 inserts the electronic cassette 10 from what is the left-hand side of the subject of imaging 19 if the subject of imaging 19 is face up.

Given these conditions, when imaging is performed with the electronic cassette 10 in the horizontal orientation, that is, when the handle 16 is attached to the short edge side face, image data representing a radiographic image is obtained with the head side of the subject of imaging 19 at the top. On the other hand, when imaging is performed with the electronic cassette 10 in the vertical orientation, that is, when the handle 16 is attached to the long edge side face, image data representing a radiographic image is obtained with the left-hand side of the subject of imaging 19 at the top.

Which of the edges of the electronic cassette 10 is to correspond with the top of a radiographic image may be specified in advance from the positional relationship of the subject of imaging 19 and the operator 17 or the like. From the relationships between the edge corresponding to the top of the radiographic image and the edges at which the attachment portions are provided, the relationship between a mounting position of the handle 16 and the orientation of a radiographic image may be ascertained.

When the electronic cassette 10 is mounted at a standing position frame, the relationship between a mounting position of the handle 16 and the orientation of a radiographic image may be ascertained similarly.

Figure 7:
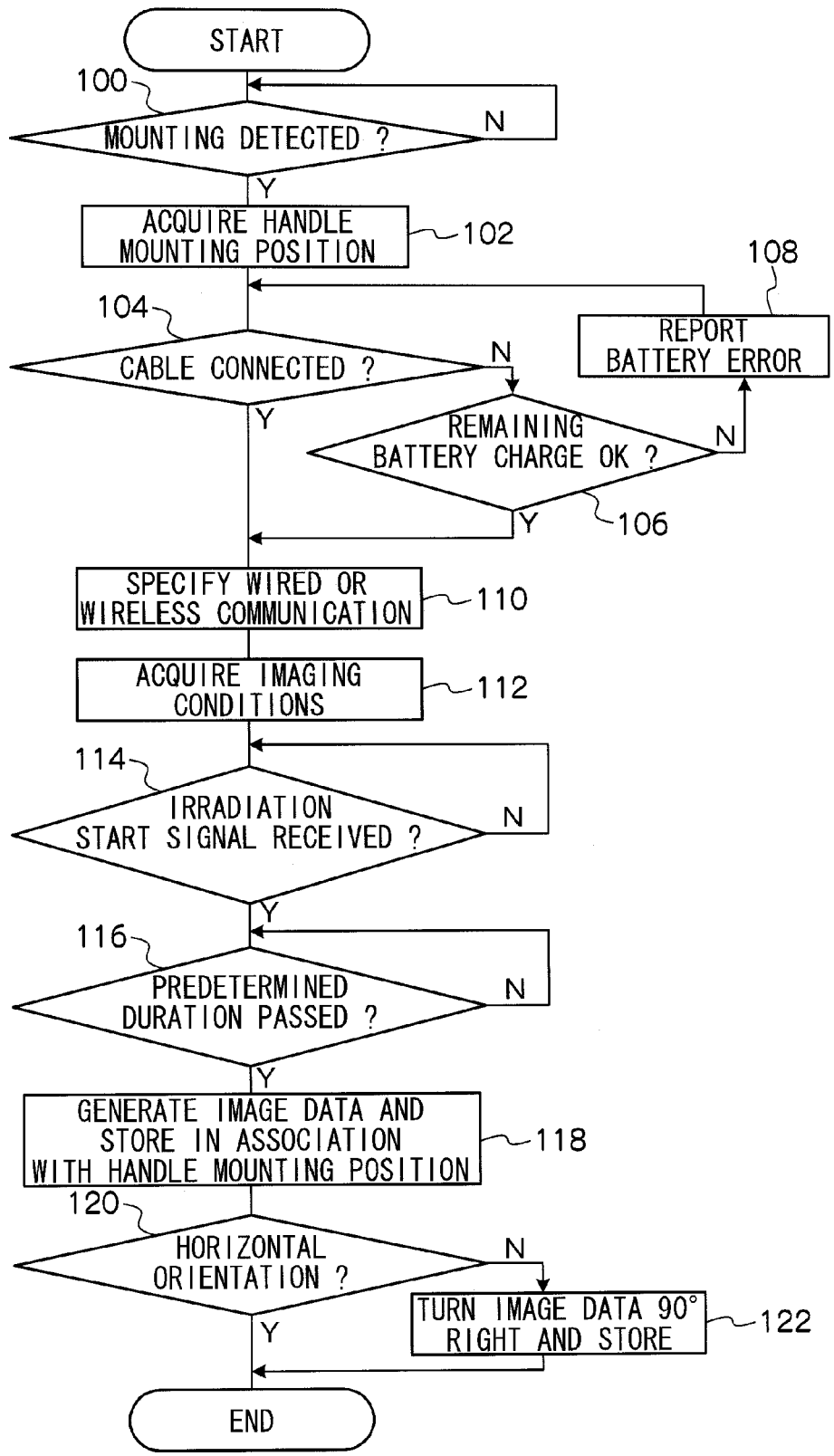
FIG. 7 is a flowchart illustrating a processing routine of image data generation processing of a first exemplary embodiment.

Next, a processing routine of image data generation processing of the first exemplary embodiment will be described with reference to FIG. 7.

In step 100, it is judged whether or not the handle 16 is mounted to the radiation detector 11. If mounting is detected, the processing advances to step 102, and if mounting is not detected, the processing waits until mounting is detected.

In step 102, the mounting position of the handle 16 is acquired by detecting through which of the attachment portions, the attachment portions 54a and 54b at the short edge side face or the attachment portions 55a and 55b at the long edge side face, the handle 16 is mounted to the radiation detector 11.

Then, in step 104, it is detected whether or not the coaxial cable 64 is connected to the connector 52a of the communication section 52. This judgment is performed by sensing output of a signal line through the coaxial cable 64. If connection is detected, the processing advances to step 110, and if no connection is detected, the processing advances to step 106.

In step 106, it is judged whether or not a remaining battery charge, which is an amount of electric power stored in the power supply section 80, is stored to an amount of electric power required for performing radiographic imaging. If this amount is stored, the processing advances to step 110, and if this amount is not stored, the processing advances to step 108, a battery error is reported by the reporting section 66, by illuminating LEDs, outputting a buzzer sound or the like, and the processing returns to step 104.

In step 110, if, according to the result of the judgment in the above-described step 104, the coaxial cable 64 is connected to the connector 52a, implementation of wired communication is specified, and if the coaxial cable 64 is not connected, implementation of wireless communication is specified. Herein, if the electronic cassette 10 is inserted between a bed and the subject of imaging 19 by handling as illustrated in FIG. 6, then, as illustrated in FIG. 5A and FIG. 5B, the handle 16 is not covered by the subject of imaging 19. Therefore, in a case of wired communication, connection of the coaxial cable 64 to the connector 52a provided in the handle 16 is simple, and in a case of wireless communication, propagation failures due to the effect of the human body may be prevented.

Then, in step 112, communication with an external device is implemented by the communication method specified in the above-described step 110, and information on imaging conditions and the like is acquired and stored in a predetermined area. The imaging conditions include information such as a radiation irradiation duration, an image data size and the like.

Next, in step 114, it is judged whether or not irradiation of the radiation has started. At a time at which a radiation irradiation start switch is turned on at an external device or the like and a radiation irradiation start signal is transmitted to the radiation generation section 18, this judgment is determined by whether or not the radiation irradiation start signal, which is also transmitted to the electronic cassette 10, has been received. If the start signal has been received, the processing advances to step 116, and if the start signal has not been received, the processing waits until the start signal is received.

In step 116, by reference to the imaging conditions stored in the above-described step 112, it is judged whether or not the predetermined radiation irradiation duration has passed. If the duration has passed, the processing advances to step 118, charges accumulated by the radiation irradiation are read out and image data is generated, and the generated image data is stored in the image memory 50. At this time, information on the handle mounting position that was acquired in step 102 is stored in association with the image data. Because the handle mounting position is associated therewith, when the radiographic image is to be checked or the like, it may be verified whether the electronic cassette 10 was in the horizontal orientation or was in the vertical orientation at the time of imaging. If the predetermined duration has not passed, the processing waits until it has passed.

Then, in step 120, it is judged whether or not the arrangement of the electronic cassette 10 is the horizontal orientation, on the basis of the handle mounting position acquired in step 102. If the handle mounting position is in the long edge side face, the arrangement is the vertical orientation, the judgment is negative, and the processing advances to step 122. If the handle mounting position is in the short edge side face, the arrangement is the horizontal orientation, the judgment is positive, and the processing ends.

In step 122, the image data stored in the image memory 50 is read out, and image processing is applied to turn the image data 90° to the right. As a result, image data is obtained that represents a radiographic image with the head side of the subject of imaging 19 to the top. Herein, suitable rotation direction and rotation angle image processing are applied in accordance with which edge of the electronic cassette 10 is specified as being at the top of the radiographic image. The image data to which the image processing has been applied is again stored in the image memory 50, and the processing ends.

As described hereabove, according to an electronic cassette of the first exemplary embodiment, a handle provided in consideration of portability is made attachable to a long edge side face and a short edge side face of a radiographic detector. Thus, in accordance with an imaging condition such as a horizontal orientation or a vertical orientation or the like, the handle may be mounted at a position at which handling of the electronic cassette is easier. Therefore, handling of the electronic cassette is facilitated. Moreover, the orientation of a radiographic image that is generated may be ascertained, by detecting a mounting position of the handle, and image data may be rotated so as to match the orientation of the radiographic image.

In the first exemplary embodiment, a case has been described in which it is judged whether the arrangement of the electronic cassette is the horizontal orientation and the image processing is applied after the generated image data has been stored in the image memory. However, it may first be judged whether or not the arrangement is the horizontal orientation, image processing applied to the generated image data on the basis of the judgment result, and then the image data stored in the image memory. Further yet, the image processing may be applied when the image data stored in the image memory is being transmitted to an external device.

Next, an electronic cassette relating to a second exemplary embodiment will be described. For the electronic cassette 10 relating to the first exemplary embodiment, a case has been described in which the orientation of the image is made to match in accordance with the handle mounting position. The second exemplary embodiment differs, however, in that the handle mounting position at a current time of imaging is compared with a previous time of imaging. The structure of the electronic cassette of the second exemplary embodiment is the same as the structure of the electronic cassette 10 of the first exemplary embodiment, so will not be described.

Figure 8:
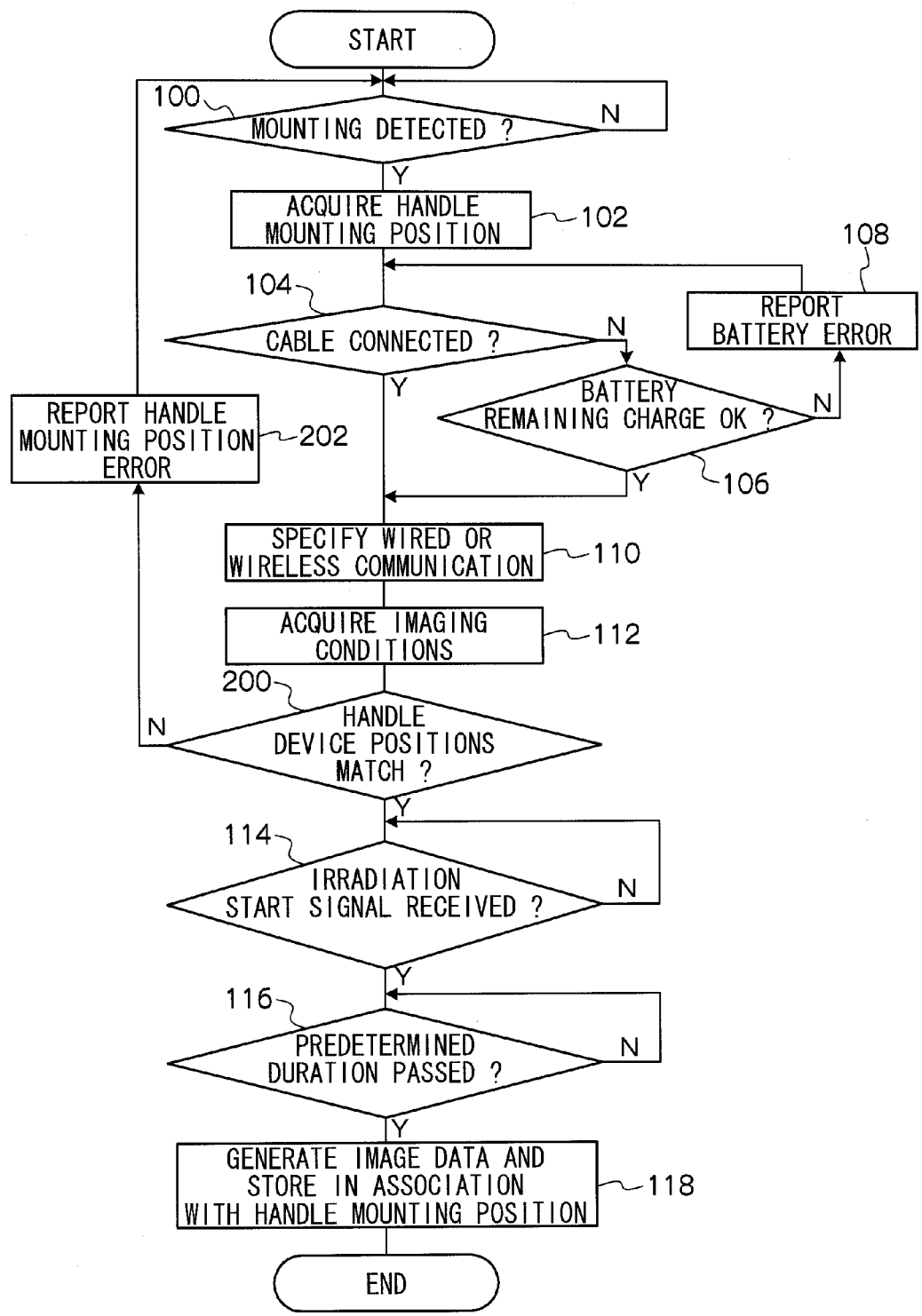
FIG. 8 is a flowchart illustrating a processing routine of image data generation processing of a second exemplary embodiment.

A processing routine of image data generation processing of the second exemplary embodiment will be described with reference to FIG. 8. Processing that is the same as in the image data generation processing of the first exemplary embodiment is assigned the same reference numerals and will not be described.

In step 112, the information of imaging conditions and the like is acquired and stored in the predetermined area. The imaging conditions acquired in this case include, in addition to information such as the radiation irradiation duration, the image data size and the like, information on the handle mounting position at the previous time of imaging.

Then, in step 200, on the basis of the information on the handle mounting position at the previous time of imaging that is included in the imaging conditions acquired in the above-described step 112 and the information on the handle mounting position that was acquired in the earlier described step 102, it is judged whether or not the current and the previous handle mounting positions match. If the handle mounting positions match, the processing advances to the processing of step 114 to step 118 and image data is generated. Here, the information on the handle mounting position that is stored in association with the image data in step 118 is used, when an image is to be checked or the like, to verify whether the electronic cassette 10 at the time of imaging was in the horizontal orientation or was in the vertical orientation, and is used for the imaging conditions at a next time of imaging, or the like.

If the current and previous handle mounting positions do not match, the processing advances to step 202, a handle mounting position error is reported by the reporting section 66, by illuminating LEDs, outputting a buzzer sound or the like, and the processing returns to step 100. When the handle 16 has been re-mounted at another attachment position by the operator 17, the judgment of step 100 is positive, and the subsequent processing is executed.

As described hereabove, according to the electronic cassette of the second exemplary embodiment, whether the arrangement of the electronic cassette is the horizontal orientation or the vertical orientation may be ascertained by detecting the position at which the handle is mounted to the radiation detector. Therefore, in a case in which imaging should be performed in the same conditions as at a previous time of imaging, for re-imaging or suchlike, or the like, an error is reported if the electronic cassette is arranged in a different arrangement from the previous time of imaging, and imaging with different imaging conditions may be prevented.

What is claimed is:
1. A radiographic image detection device comprising:
a radiation detection portion that includes an irradiation surface at which radiation is irradiated and is provided, at a plurality of locations on side faces, with attachment portions at which a handle is attachable, the radiation detection portion detecting radiation that has passed through a subject of imaging and been irradiated through the irradiation surface, and outputting image information that represents a radiographic image in accordance with detected radiation amounts;

a handle portion that is attachable and detachable at the attachment portions;

a detection section that detects a position of the attachment portion at which the handle portion is attached;

a control section that controls such that the position detected by the detection section and the image information outputted from the radiation detection portion are stored in association in a storage section;

an image processing section that, on the basis of the position detected by the detection section, performs image processing that rotates the image information stored in the storage section so as to correspond to an orientation of the radiographic image represented by the image information outputted from the radiation detection portion.

2. The radiographic image detection device according to claim 1, wherein the radiation detection portion is rectangular and the attachment portions are provided at each of a long edge side face and a short edge side face.

3. The radiographic image detection device according to claim 1, wherein the handle portion includes a reporting section that reports when an attachment position of the handle portion at a previous occasion of detecting radiation and an attachment position of the handle portion at a current occasion of detecting radiation are different.

4. The radiographic image detection device according to claim 1, wherein at least one of a communication section, for implementing communications with an external device, and a power supply, for driving the radiation detection portion, is provided in the handle portion.

5. The radiographic image detection device according to claim 1, wherein a ventilation aperture for ventilating air inside the radiation detection portion is formed at at least one of the attachment portions.

6. The radiographic image detection device according to claim 2, wherein a ventilation aperture for ventilating air inside the radiation detection portion is formed at at least one of the attachment portions.

* * * * *